United States Patent
Williams (10) Patent No.: US 6,970,594 B2
(45) Date of Patent: Nov. 29, 2005

(54) VISUALIZATION IMAGING SYSTEM FOR CURVILINEAR STRUCTURES

(75) Inventor: James P. Williams, Princeton Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 645 days.

(21) Appl. No.: 10/171,569

(22) Filed: Jun. 12, 2002

(65) Prior Publication Data

US 2003/0137504 A1 Jul. 24, 2003

Related U.S. Application Data

(60) Provisional application No. 60/350,623, filed on Jan. 22, 2002.

(51) Int. Cl.[7] .............................................. G06K 9/00
(52) U.S. Cl. ...................................... 382/154; 382/131
(58) Field of Search .................................. 382/131, 154

(56) References Cited

U.S. PATENT DOCUMENTS 6,690,816 B2 * 2/2004 Aylward et al. ............ 382/128
6,842,638 B1 * 1/2005 Suri et al. ................... 600/425

OTHER PUBLICATIONS

Kanistar A., et al.: "Peripheral Vessel Investigation For Routine Clinical Use"Online! (Dec. 31, 2001), XP002272178 Retrieved from the Internet: URL:ftp//ftp.c-q.tuwein.ac.at/pub/TR/01/TR-186-2-01-13Paper.pdf> 'retrieved on Mar. 1 2004! Abstract p. 1, chapter 2, first paragraph p. 2, chapter 3.1, left column p. 2, chapter 3.1, right column, first paragraph figures 2, 8.

Farin Gerald E.: "Curves and Surfaces for Computer Aided Geometric Design" (Dec. 31, 1988), Academic Press, London, XP002272179 subchapter, 11.1 figure 11.1.

* cited by examiner

Primary Examiner—Jingge Wu
Assistant Examiner—Ashutosh Upreti
(74) Attorney, Agent, or Firm—Donald B. Paschburg; F. Chau & Associates LLP (57) ABSTRACT

Disclosed is a method of analyzing curvilinear structures by receiving three-dimensional space imaging data of a curvilinear structure, defining an axis curve within the curvilinear structure, sweeping a line segment along said axis curve so as to define a ribbon in said three-dimensional space, and adsorbing data from said three-dimensional space onto said ribbon.

This ribbon may then be flattened for convenient examination.

10 Claims, 13 Drawing Sheets

VISUALIZATION IMAGING SYSTEM FOR CURVILINEAR STRUCTURES

CROSS-REFERENCE TO RELATED APPLICATIONS

This application is based upon and claims the benefit of U.S. Provisional Patent Application No. 60/350,623, filed Jan. 22, 2002, the disclosures of which are incorporated by reference herein in their entirety.

FIELD OF THE INVENTION

This invention relates to 3-D imaging systems, particularly medical imaging systems.

BACKGROUND OF THE INVENTION

Currently, physicians use a variety of visualization methods for 3D data: Volume Rendering, Multi-Planar Reformat, Maximum Intensity Projection, Surface Shaded display to name some of the most popular methods.

Visualization and segmentation are tightly coupled in the postprocessing workflow. The earliest and most prevalent visualization technique for MR \& CT angio studies has been the maximum intensity projection (MIP). MIP visualization projects the entire volume along a single direction vector onto a plane. The intensity value of a pixel in the projected image is the maximum intensity value of all voxels which project to that particular 2D point. MIP is an excellent tool for vascular visualization, but it lacks depth information. The impression of 3D is conveyed through interactive rotation of the view, but it is difficult for the user to discern when vessels pass in front or behind one another. It is also difficult to see surface features of vessels (for example the small bump of a nascent aneurysm), because surface information is lost in the projection.

Surface Shaded Display (SSD) is a technique in which the volume is initially thresholded so that all pixels above a certain intensity value are labeled as belonging to the object(s) to be visualized. Object voxels are considered to be completely opacified and are rendered using lighting and local surface normal computations to reveal details through shading and specular highlights. The highlights provide strong visual clues to surface irregularities like bumps and depressions. Because only those voxels on the surface of the object are visible to the user, SSD can be easily optimized to operate at real-time speed without the need for special hardware acceleration. SSD is very effective for visualizing CT vascular data which can be reliably thresholded. For MR, however, inhomogeneities in the signal due to coil proximity artifacts and gain irregularities make SSD unreliable in moderate to low quality MR studies.

Multi-Planar Reformat (MPR) is a known technique in which a 2-D image is created by resampling the volume on an arbitrary plane. It produces an image which looks like an original slice, but with an arbitrary position and orientation. Since traditional MPR is limited to a plane, it is often not possible to visualize curved structures in a single MPR view.

Also known in the art is curved MPR, a technique which resamples 3D data into a 2D image on a surface created by sweeping a planar curve along a linear path orthogonal to the plane containing the curve. Curved MPR is better than traditional MPR at capturing curved structures in a single reformat, but it cannot track curvilinear structures with highly tortuous trajectories.

SUMMARY OF THE INVENTION

Disclosed is a method of analyzing curvilinear structures, comprising receiving three-dimensional space imaging data of a curvilinear structure, defining an axis curve within the curvilinear structure, sweeping a line segment along said axis curve so as to define a ribbon in said three-dimensional space, and adsorbing data from said three-dimensional space onto said ribbon.

In another aspect of the method, said axis curve is defined as a function $C(t)$ of a parameter t, said parameter representing the distance along said axis.

In another aspect of the method, said ribbon is defined as a function $S(s,t)$ based upon a frame $F=(f_1(t), f_2(t), f_3(t))$ wherein $f_1$, $f_2$, and $f_3$ are unit-vector-valued functions in three-space and s is a parameter defining a position along said line segment, said line segment orthogonal to a tangent to said axis, such that $S(s,t)=f_2(t)*s+C(t)$.

Another aspect of the method further comprises flattening said ribbon into a two-dimensional strip.

Another aspect of the method further comprises flattening said ribbon into a two-dimensional strip.

In another aspect of the method, said flattening is accomplished by defining a two-dimensional image for which one axis is said s parameter and the remaining axis is said t parameter.

Disclosed is a program storage device, readable by machine, tangibly embodying a program of instructions executable by the machine to perform method steps for analyzing curvilinear structures, said method steps comprising receiving three-dimensional space imaging data of a curvilinear structure, defining an axis curve within the curvilinear structure, sweeping a line segment along said axis curve so as to define a ribbon in said three-dimensional space, and adsorbing data from said three-dimensional space onto said ribbon.

In another aspect of the apparatus, said axis curve is defined as a function $C(t)$ of a parameter t, said parameter representing the distance along said axis.

In another aspect of the apparatus, said ribbon is defined as a function $S(s,t)$ based upon a frame $F=(f_1(t), f_2(t), f_3(t))$ wherein $f_1$, $f_2$, and $f_3$ are unit-vector-valued functions in three-space and s is a parameter defining a position along said line segment, said line segment orthogonal to a tangent to said axis, such that $S(s,t)=f_2(t)*s+C(t)$.

Another aspect of the apparatus further comprises flattening said ribbon into a two-dimensional strip.

Another aspect of the apparatus further comprises flattening said ribbon into a two-dimensional strip.

In another aspect of the apparatus, said flattening is accomplished by defining a two-dimensional image for which one axis is said s parameter and the remaining axis is said t parameter.

Disclosed is an imaging system for analyzing curvilinear structures, comprising means for receiving three-dimensional space imaging data of a curvilinear structure, means for defining an axis curve within said curvilinear structure, means for sweeping a line segment along said axis curve so as to define a ribbon in said three-dimensional space, and adsorbing data from said three-dimensional space onto said ribbon.

Another aspect of the imaging system further comprises means for flattening said ribbon into a two-dimensional strip.

DETAILED DESCRIPTION OF PREFERRED EMBODIMENTS

This invention locates tube-like objects in three-dimensional imaging data and provides a means for analyzing such objects. The invention is particularly useful for medical imaging, for it provides a way for physicians to examine blood vessels and other curvilinear structures in the body from 3-D imaging data derived from magnetic resonance (MR) or computed tomography (CT) scanners and the like. The invention is preferably rendered executable code readable by a machine, such as a computer.

To understand the workings of the invention, it is instructive to discuss the basic theory of it's operation, which will be described with respect to FIGS. 1 through 7.

Figure 1:
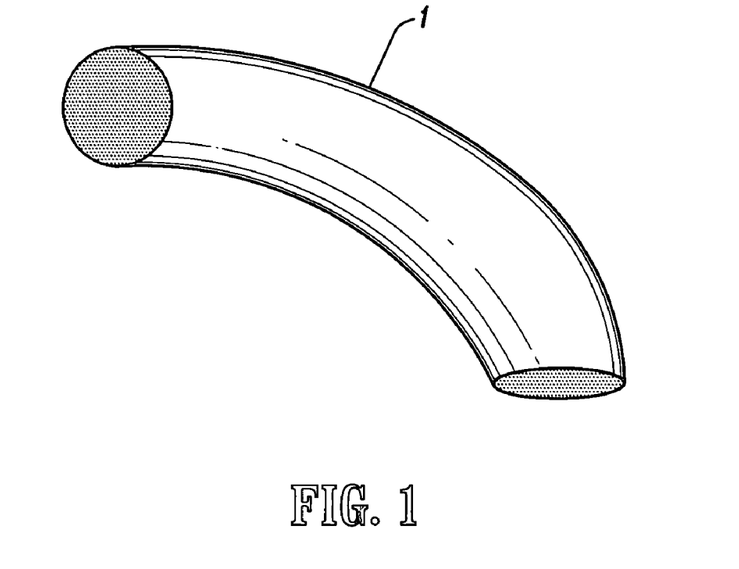
FIG. 1 shows a typical tube-like structure.

Referring to FIG. 1, there is depicted a typical curvilinear structure, namely a tube-like object 1.

Figure 2:
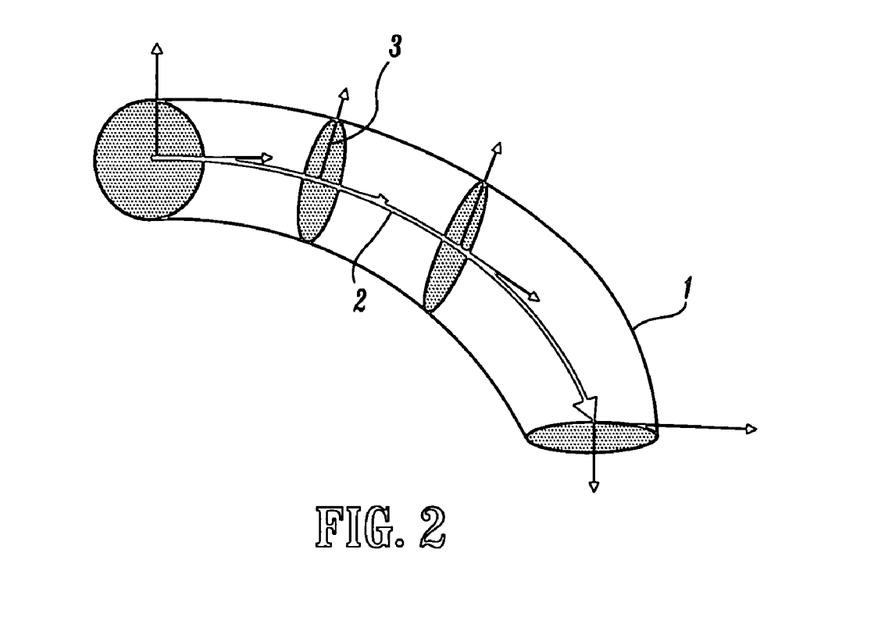
FIG. 2 shows a circular sweep.

Referring to FIG. 2, one way to describe the tube 1 in 3-D imaging terms is to think of the tube as a region of space swept out by a circle 3 moving along an axis curve 2, the circle 3 remaining orthogonal to this axis curve 2 as it sweeps through 3-D space.

Figure 3:
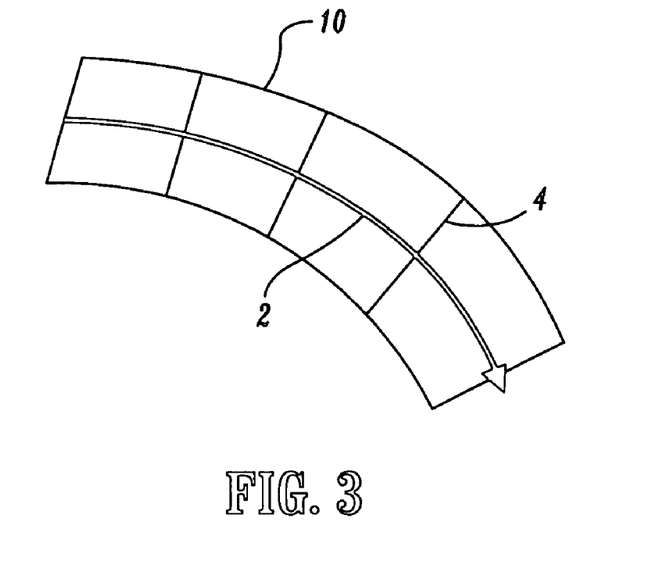
FIG. 3 shows a line-segment sweep of the invention.
Figure 4:
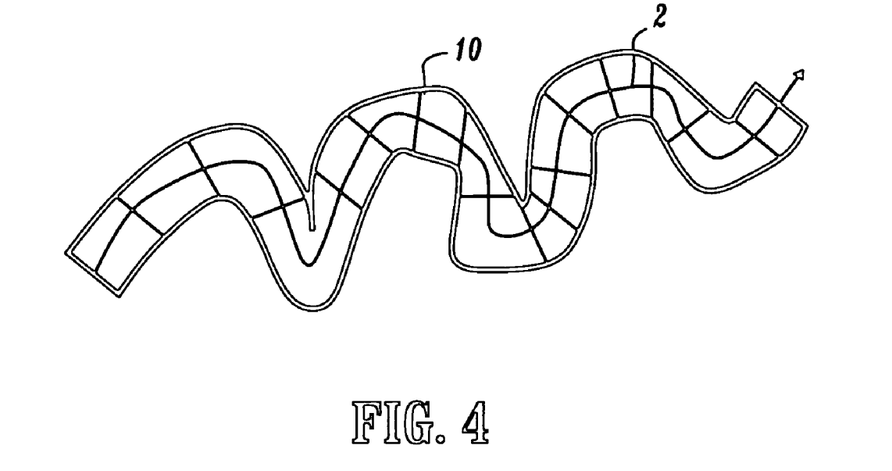
FIG. 4 shows a 3-D ribbon of the invention.

Referring to FIGS. 3 and 4, consider the result if a line segment 4, rather than a circle were swept through the tube, then the result would be to define a ribbon 10 in space. As can be seen in FIG. 4, if the axis curve 4 is twisty and curvy, then the ribbon 10 will also have curves and twists.

Mathematically, given three-dimensional data $V(x,y,z)$ and an axis curve $C(t)$ defined within the bounds of V, one may define a swept surface $S(s,t)$ based upon a frame $F=(f_1(t), f_2(t), f_3(t))$ where $f_1$, $f_2$, and $f_3$ are unit-vector-valued functions in three-dimensional space, t is the distance along the axis of the swept surface where the surface is parameterized to have a total length of $t=1$, and s is the parameter that defines position along a line segment orthogonal to a tangent to the axis, that is to say the width of the ribbon, also parameterized to have a total width $s=1$ (so the axis is located at $s=0.5$). For a given value of t, the origin of the frame F will be $C(t)$, the axis curve 2, and $f_1$ will be the normalized tangent vector. $C'(t)/\|C'(t)\|$ (where $C'$ represents the derivative of C with respect to t) and $f_2$ and $f_3$ combined with $f_1$ produces an orthonormal frame. From this we obtain the equation:

$$S(s,t)=f_2(t)*s+C(t)$$

Figure 5:
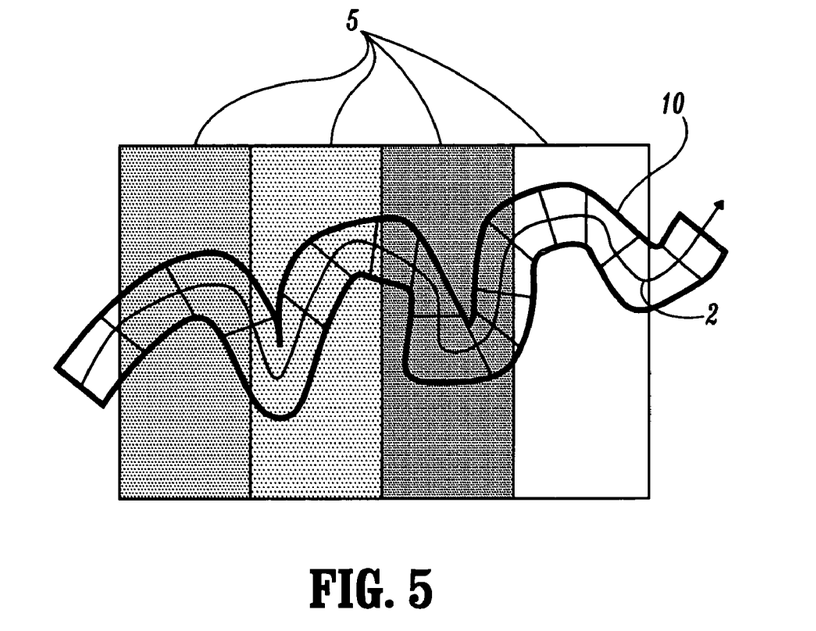
FIGS. 5 and 6 show the adsorption of scalar data onto the ribbon.

Referring to FIG. 5, consider now that the ribbon is defined in a field of 3-D data that has one or more scalar values associated with it. For example the scalar value could be color or intensity or any other quantity. To illustrate this, various shaded zones 5 are shown in FIG. 5, illustrating differing fields of intensity.

Figure 6:
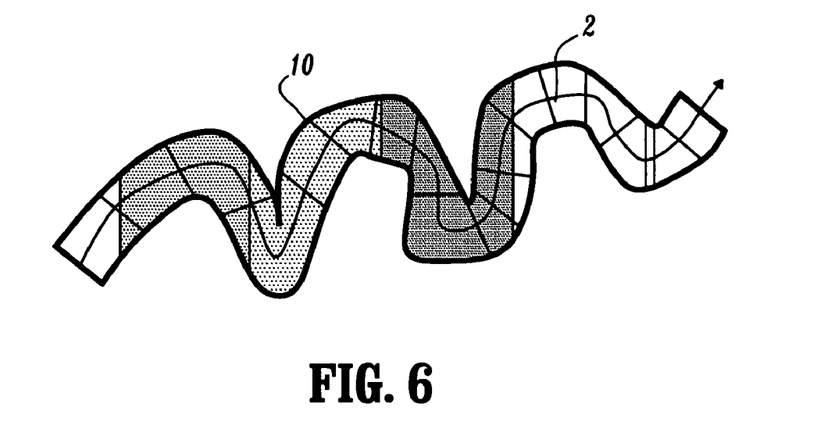

Referring to FIG. 6, we now let the ribbon 10 adsorb the varying shades from the 3-D space. This is simply a matter of mapping data from the volume to the ribbon surface by functional composition, namely $V(S(s,t))$.

Figure 7:
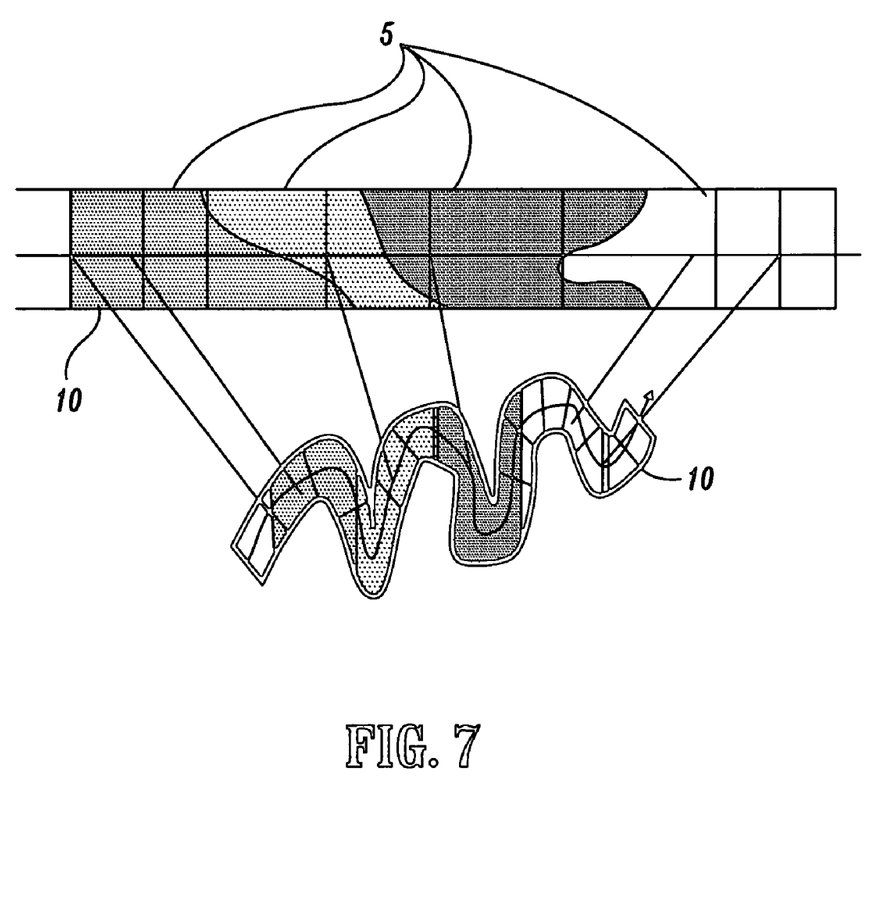
FIG. 7 shows the flattening of the ribbon.

Referring to FIG. 7 we may now flatten the ribbon 10 out onto a planar surface. This flattening may be accomplished by defining a two dimensional image for which one axis is the s-parameter and the other the t-parameter. Notice how the shaded regions 5 that were once rectilinear in 3-D space are now distorted. Nevertheless, each point of the flattened 2-D ribbon maps back to a point in the 3-D space. We now have a convenient, easily examined strip of data that may be analyzed to determine the properties of the tube.

Figure 8:
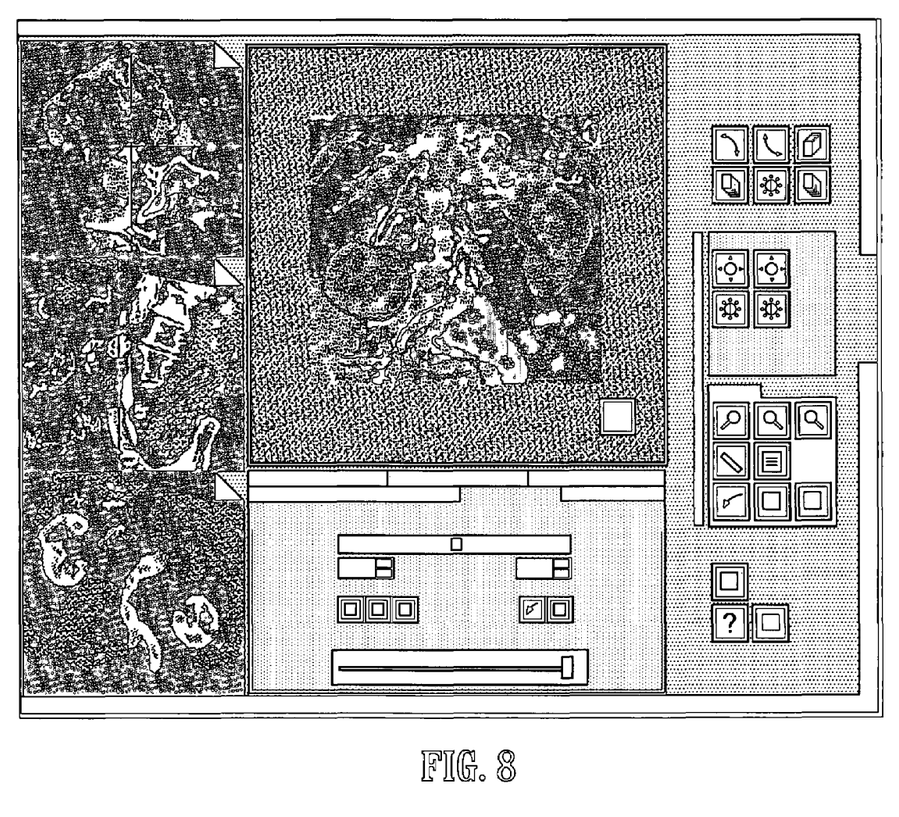
FIG. 8 shows typical 3-D medical imaging.

Referring to FIG. 8 we now approach a real-world problem. FIG. 8 shows a typical CT scan image and display as might be seen on any medical workstation. The image is three-dimensional, meaning it is made up of voxels of information.

Figure 9:
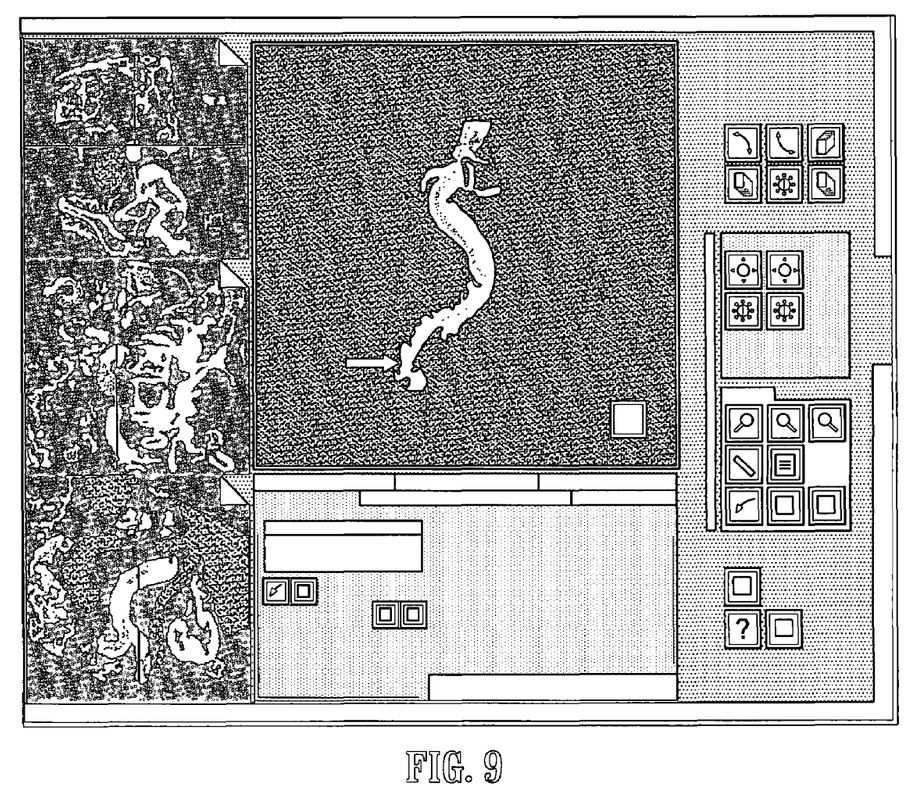
FIG. 9 shows a blood vessel segmented out of the 3-D image.

Referring to FIG. 9, the first step in analyzing the CT data is to isolate the tube-like structure of interest with a segmentation algorithm. In this example we are interested in a particular blood vessel as shown.

The list of most commonly used segmentation techniques includes thresholding, region growing, split-and-merge, segmentation by clustering, snakes, level set methods, and others. Multi-dimensional dynamic data presents significant challenges for segmentation techniques. Each volume of a dynamic sequence has to be quickly obtained over a short period of time. As a result, the data sets may have very low resolution with strong "partial voluming" effects. Certain perfusion applications use low doses of contrast-enhancing agent that may further reduce the contrast in each volume, such as those described in V. S. Lee, H. Rusinek, G. Johnson, N. Rofsky, G. A. Krinsky, and J. C. Weinreb, *Ultra-Low Dose Gadolinium-DTPA MR Renography for The Diagnosis of Renovascular Disease*, Radiology (2001); and in H. Rusinek, V. S. Lee, and G. Johnson, *Optimal Dose of Gd-DTPA for Dynamic MR Studies*, Magnetic Resonance in Medicine (2001), the disclosures of which are incorporated by reference herein in their entirety.

A preferred segmentation algorithm is described in commonly assigned patent application U.S. Ser. No. 10/129,125, filed Apr. 10, 2002, for SEGMENTATION OF DYNAMIC MULTIDIMENSIONAL DATA SETS, the disclosures of which are incorporated by reference herein in their entirety.

Figure 10:
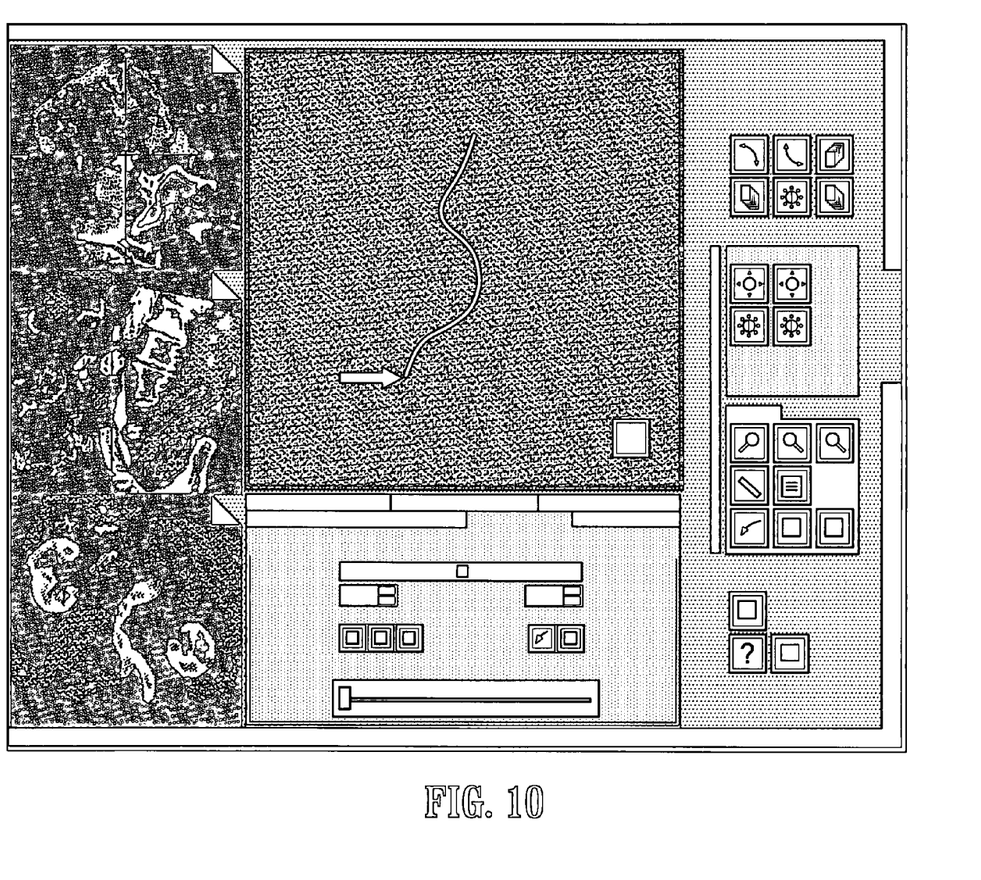
FIG. 10 shows an axis curve.

Referring to FIG. 10, the system of the invention defines the axis of the vessel as a curve in three-dimensional space.

Figure 11:
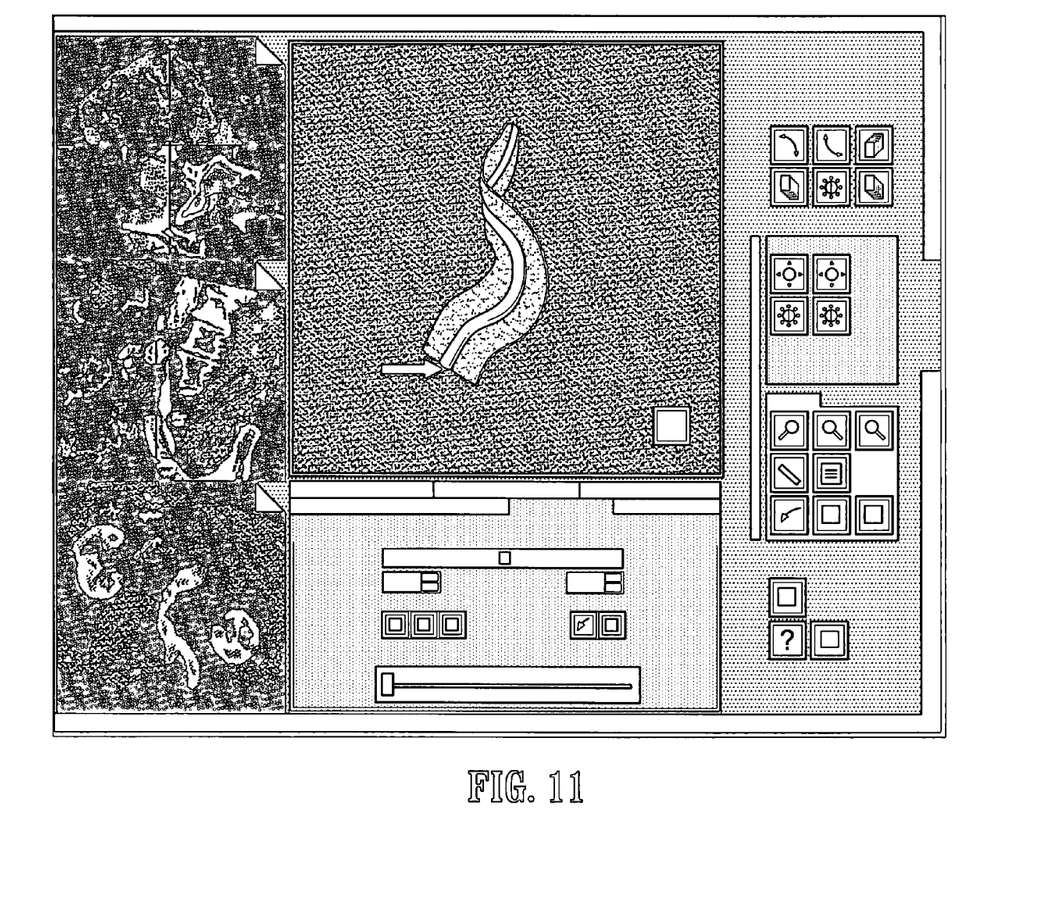
FIGS. 11 and 12 show a ribbon of the invention for the blood vessel.
Figure 12:
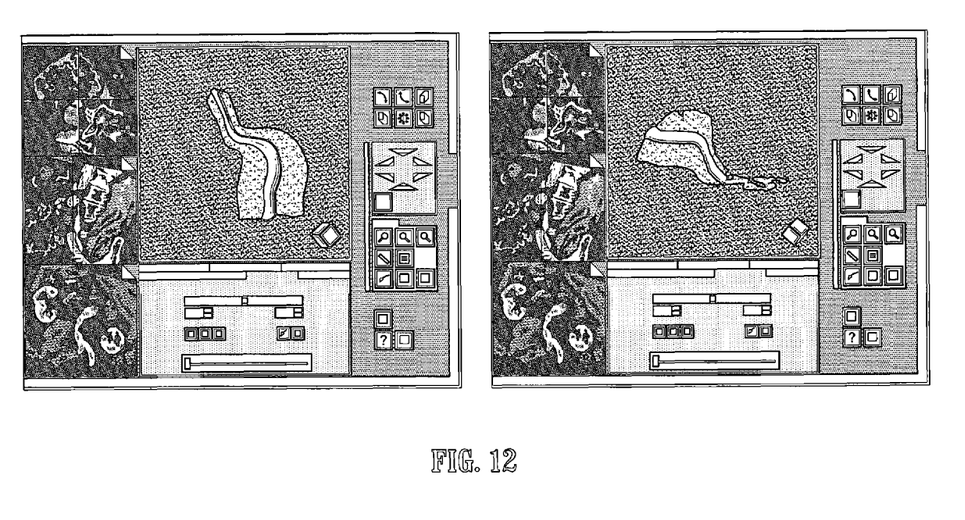

Referring to FIGS. 11 and 12 a line segment is swept along the axis curve to form a ribbon and the image data is adsorbed onto it. When sweeping the line segment along the axis, it is preferable to minimize the amount of torque or "twist."

Figure 15:
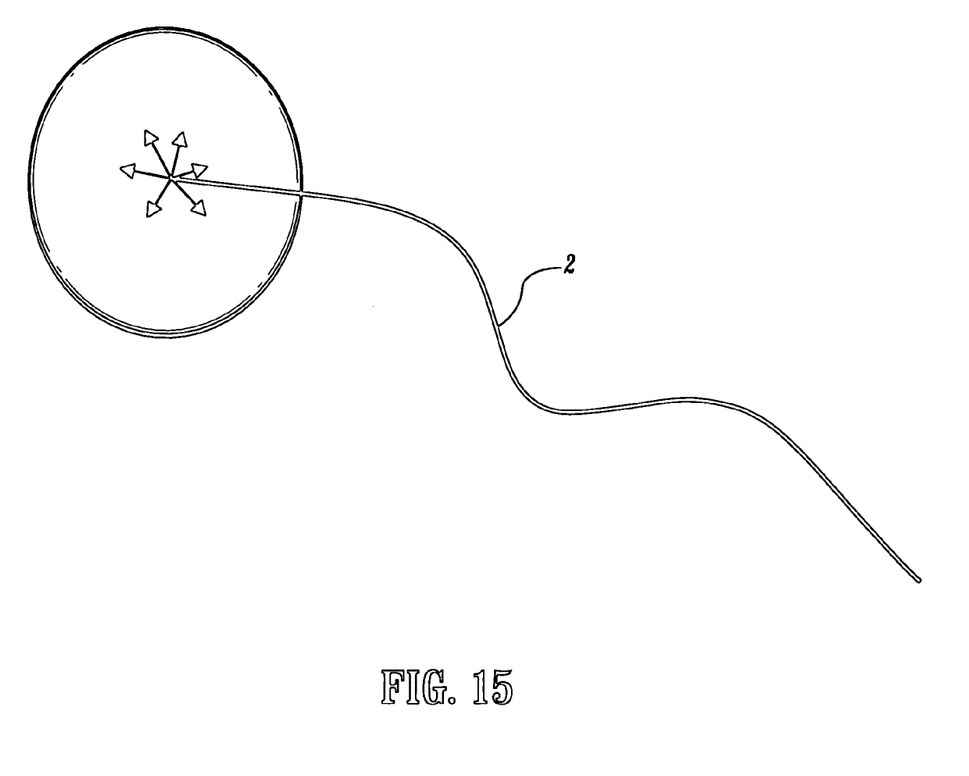
FIG. 15 shows the start of a sweep of the invention.

There is, in fact, a unique family of solutions for such a sweep. There is a single solution for the expression for the tangent function which minimizes torsion (in the differential geometry sense) of the curve. However, the two mutually orthogonal vectors are free to rotate around the tangent vector. This is why the solutions form a 1-parameter family. Referring to FIG. 15, the parameter is the angular position of the line segment at the start of the sweep with respect to the axis curve, which may of course take a value of from 0 to 180 degrees. Each unique value of the parameter defines a unique ribbon. In a preferred embodiment, multiple ribbons are sampled and presented to the user. The ribbons may also be animated, to show to the user what the effect of rotating the starting position of the segment is. For medical imaging purposes, generally these samples will be generated by changing the starting parameter in 5 to 10 degree increments.

Figure 13:
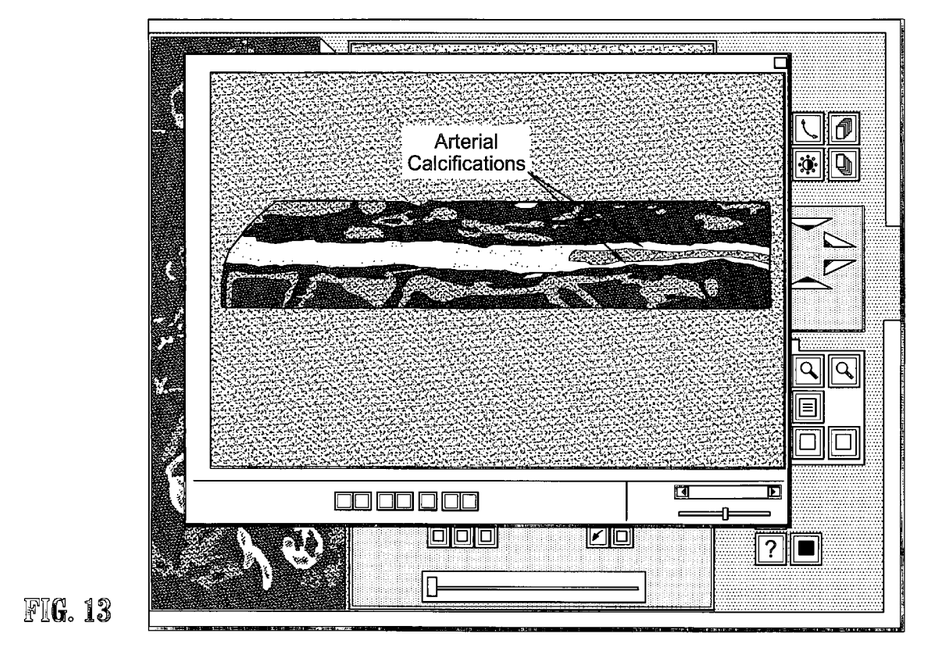
FIGS. 13 and 14 show the ribbon flattened.
Figure 14:
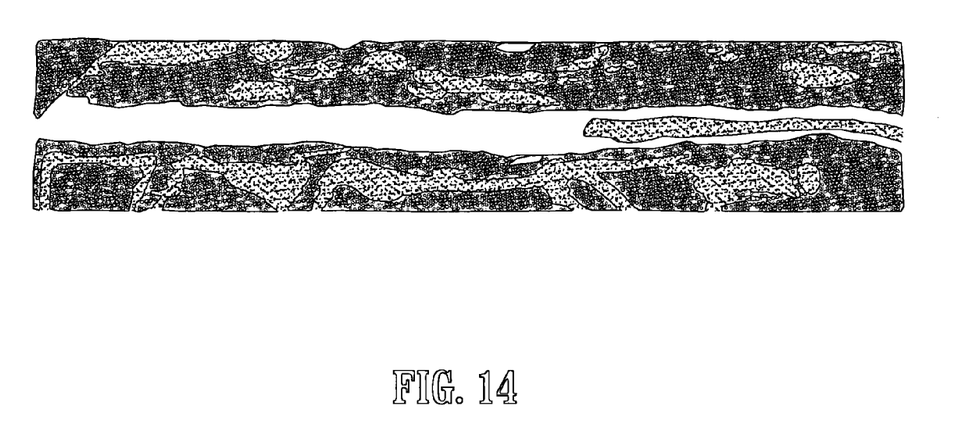

Referring to FIG. 13, when the ribbon is flattened out the image data is in a form ready for convenient analysis. By using a sweep with minimal torque, distortions are minimized. In the image shown, for example, arterial calcifications for this blood vessel are easily spotted.

Figure 16:
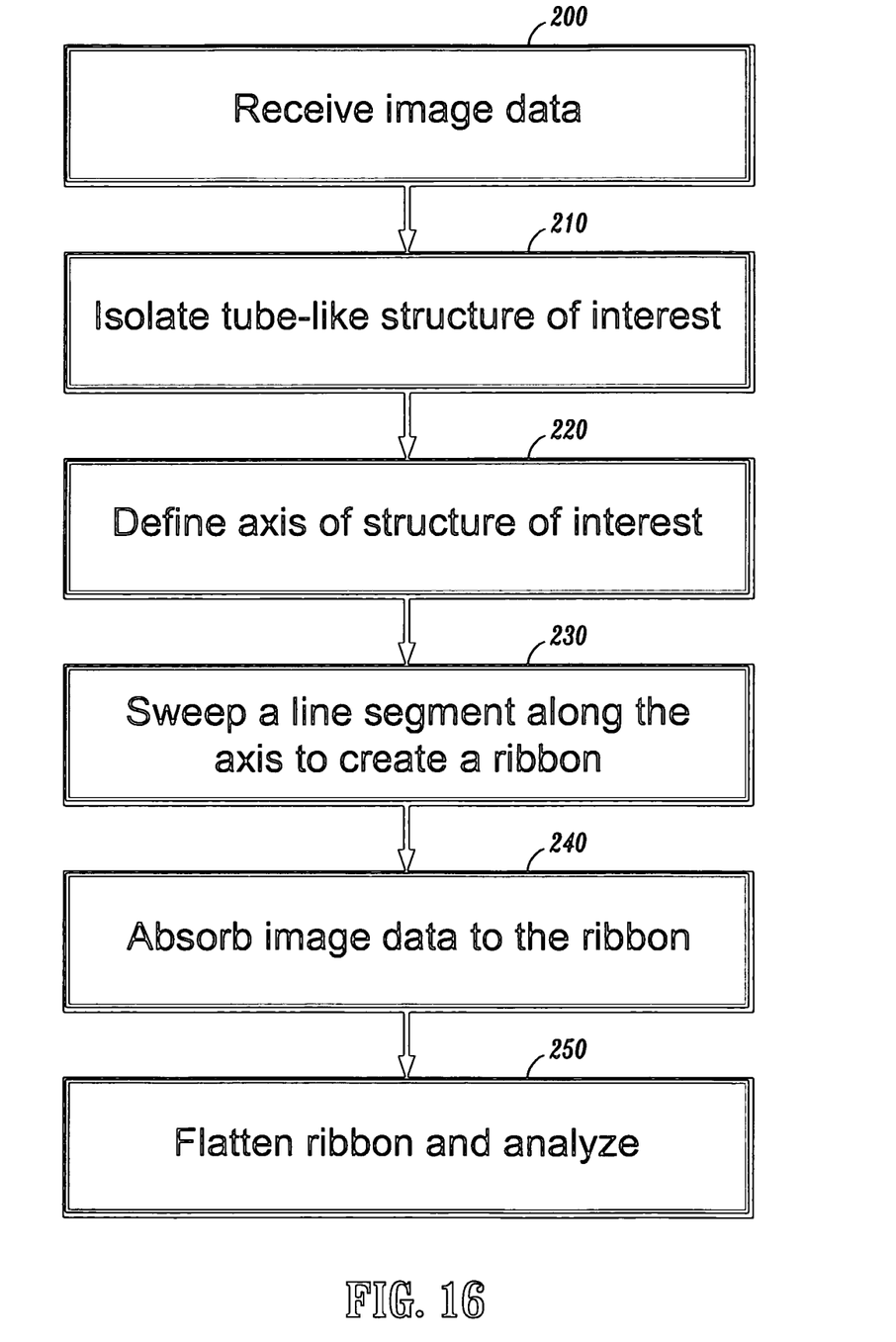
FIG. 16 is a flowchart of the method of the invention.

Referring to FIG. 16, there is shown a flowchart of the overall method of the invention, namely receiving 200 image data, segmenting 210 out the tube-like structure of interest, defining 220 the axis curve, sweeping 230 a line segment along the axis curve, adsorbing 240 image data onto the ribbon, and then flattening 250 the ribbon to two dimensions.

The methods of the invention may be implemented as a program of instructions, readable and executable by machine such as a computer, and tangibly embodied and stored upon a machine-readable medium such as a computer memory device.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of analyzing curvilinear structures, comprising:
    receiving three-dimensional space imaging data of a curvilinear structure;
    defining an axis curve within the curvilinear structure;
    sweeping a line segment along said axis curve so as to define a ribbon in said three-dimensional space; and
    adsorbing data from said three-dimensional space onto said ribbon
    wherein said axis curve is defined as a function $C(t)$ of a parameter t, said parameter representing the distance along said axis,
    wherein said ribbon is defined as a function $S(s,t)$ based upon a frame $F=(f_1(t), f_2(t), f_3(t))$ wherein $f_1$, $f_2$, and $f_3$ are unit-vector-valued functions in three-space and s is a parameter defining a position along said line segment, said line segment orthogonal to a tangent to said axis, such that $S(s,t)=f_2(t)*s+C(t)$.

2. The method of claim 1 further comprising flattening said ribbon into a two-dimensional strip.

3. The method of claim 1 further comprising flattening said ribbon into a two-dimensional strip.

4. The method of claim 3 wherein said flattening is accomplished by defining a two-dimensional image for which one axis is said s parameter and the remaining axis is said t parameter.

5. A program storage device, readable by machine, tangibly embodying a program of instructions executable by the machine to perform method steps for analyzing curvilinear structures, said method steps comprising:
    receiving three-dimensional space imaging data of a curvilinear structure;
    defining an axis curve within the curvilinear structure;
    sweeping a line segment along said axis curve so as to define a ribbon in said three-dimensional space; and
    adsorbing data from said three-dimensional space onto said ribbon
    wherein said axis curve is defined as a function $C(t)$ of a parameter t, said parameter representing the distance along said axis,
    wherein said ribbon is defined as a function $S(s,t)$ based upon a frame $F=(f_1(t), f_2(t), f_3(t))$ wherein $f_1$, $f_2$, and $f_3$ are unit-vector-valued functions in three-space and s is a parameter defining a position along said line segment, said line segment orthogonal to a tangent to said axis, such that $S(s,t)=f_2(t)*s+C(t)$.

6. The apparatus of claim 5 further comprising flattening said ribbon into a two-dimensional strip.

7. The apparatus of claim 5 further comprising flattening said ribbon into a two-dimensional strip.

8. The apparatus of claim 7 wherein said flattening is accomplished by defining a two-dimensional image for which one axis is said s parameter and the remaining axis is said t parameter.

9. An imaging system for analyzing curvilinear structures, comprising:
    means for receiving three-dimensional space imaging data of a curvilinear structure;
    means for defining an axis curve within said curvilinear structure;
    means for sweeping a line segment along said axis curve so as to define a ribbon in said three-dimensional space; and
    means for adsorbing data from said three-dimensional space onto said ribbon,
    wherein said axis curve is defined as a function $C(t)$ of a parameter t, said parameter representing the distance along said axis,
    wherein said ribbon is defined as a function $S(s,t)$ based upon a frame $F=(f_1(t), f_2(t), f_3(t))$ wherein $f_1$, $f_2$, and $f_3$ are unit-vector-valued functions in three-space and s is a parameter defining a position along said line segment, said line segment orthogonal to a tangent to said axis, such that $S(s,t)=f_2(t)*s+C(t)$.

10. The imaging system of claim 9 further comprising means for flattening said ribbon into a two-dimensional strip.

* * * * *